US011553511B2

(12) United States Patent
Bai et al.

(10) Patent No.: US 11,553,511 B2
(45) Date of Patent: Jan. 10, 2023

(54) ENHANCED CONTROL SIGNALING USING FULL-DUPLEX COMMUNICATION IN WIRELESS COMMUNICATION NETWORK

(71) Applicant: Intel Corporation, Santa Clara, CA (US)

(72) Inventors: Jingwen Bai, San Jose, CA (US); Shu-Ping Yeh, Campbell, CA (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 16/766,142

(22) PCT Filed: Apr. 2, 2018

(86) PCT No.: PCT/US2018/025727
§ 371 (c)(1),
(2) Date: May 21, 2020

(87) PCT Pub. No.: WO2019/194786
PCT Pub. Date: Oct. 10, 2019

(65) Prior Publication Data
US 2020/0367271 A1    Nov. 19, 2020

(51) Int. Cl.
*H04W 72/12* (2009.01)
*H04B 7/0456* (2017.01)
(Continued)

(52) U.S. Cl.
CPC ...... *H04W 72/1278* (2013.01); *H04B 7/0486* (2013.01); *H04B 7/0632* (2013.01);
(Continued)

(58) Field of Classification Search
CPC  H04W 72/1278; H04W 72/14; H04B 7/0486; H04B 7/0632; H04B 7/0639;
(Continued)

(56) References Cited

U.S. PATENT DOCUMENTS 9,660,793 B2    5/2017  Aryafar et al.
2008/0232307 A1*  9/2008  Pi ..................... H04W 72/14
                                                    370/328

(Continued)

FOREIGN PATENT DOCUMENTS

WO        201718891 A1     11/2017
WO        2017222511 A1    12/2017

OTHER PUBLICATIONS

International Patent Office—International Search Report and Written Opinion dated Jan. 28, 2019, from International Application No. PCT/US2018/025727, 31 pages.

(Continued)

*Primary Examiner* — Habte Mered
(74) *Attorney, Agent, or Firm* — Schwabe, Williamson & Wyatt, P.C.

(57) ABSTRACT

Embodiments of the present disclosure describe methods, apparatuses, and systems for enhanced control signaling using full-duplex communication in wireless communication networks. A base station may schedule a first user equipment (UE) for primary access to a set of time-frequency resources in a first communication direction (e.g., uplink or downlink). The base station may additionally schedule a second UE for secondary access to the same set of time-frequency resources in a second communication direction that is the opposite of the first communication direction. The secondary access may be used to communicate supplemental control information, such as a channel quality indicator (CQI) and/or modulation and coding scheme (MCS) feedback, hybrid automatic repeat request (HARQ) feedback, and/or multiple input multiple output (MIMO) feedback (e.g., including a rank indicator (RI) and/or a pre-coding matrix indicator (PMI). Other embodiments may be described and claimed.

23 Claims, 10 Drawing Sheets

(51) Int. Cl.
*H04B 7/06* (2006.01)
*H04L 1/00* (2006.01)
*H04L 1/18* (2006.01)
*H04L 5/16* (2006.01)
*H04W 72/14* (2009.01)

(52) U.S. Cl.
CPC ......... *H04B 7/0639* (2013.01); *H04L 1/0003* (2013.01); *H04L 1/0026* (2013.01); *H04L 1/1812* (2013.01); *H04L 5/16* (2013.01); *H04W 72/14* (2013.01)

(58) Field of Classification Search
CPC ... H04L 1/0003; H04L 1/0026; H04L 1/1812; H04L 5/16; H04L 2001/0098
See application file for complete search history.

(56) References Cited

U.S. PATENT DOCUMENTS

| | | | | |
|---|---|---|---|---|
| 2014/0301217 | A1* | 10/2014 | Choi | H04W 28/08 370/278 |
| 2014/0362797 | A1* | 12/2014 | Aiba | H04L 1/0026 370/329 |
| 2015/0327293 | A1* | 11/2015 | Luo | H04W 72/1263 370/252 |
| 2016/0330011 | A1* | 11/2016 | Lee | H04W 52/10 |
| 2016/0381601 | A1* | 12/2016 | Goldhamer | H04L 47/125 370/280 |
| 2017/0055281 | A1* | 2/2017 | Islam | H04W 72/1284 |
| 2018/0084582 | A1* | 3/2018 | Liu | H04W 74/0808 |
| 2018/0302197 | A1* | 10/2018 | He | H04L 5/14 |
| 2019/0349945 | A1 | 11/2019 | Yeh et al. | |
| 2020/0119890 | A1 | 4/2020 | Yet et al. | |
| 2021/0014791 | A1* | 1/2021 | Freda | H04W 52/0229 |
| 2021/0058927 | A1* | 2/2021 | Zhou | H04W 72/085 |

OTHER PUBLICATIONS

Qualcomm Incorporated, "TxOP Frame Structure for NR unlicensed," 3GPP TSG RAN WG1 Meeting #92, R1-1802866, Agenda item: 7.6.5, Feb 26-Mar. 2, 2018, Athens, Greece, 3 pages.

Samsung, "Multiplexing PUSCH with Short PUCCH or SRS," 3GPP TSG RAN WG1 #91, R1-1720337, Agenda item: 7.3.2.5, Nov. 9-13, 2017, Reno, USA, 2 pages.

Choi et al., "Simultaneous Transmission and Reception: Algorithm, Design and System Level Performance," IEEE Transactions on Wireless Communications, arXiv:1309.5546v1 [cs.NI] Sep. 22, 2013, 20 pages.

* cited by examiner

300

Scheduling a first UE for primary access in a first communication direction on a resource block of a wireless communication network
304

Scheduling a second UE for secondary access in a second communication direction on the resource block, wherein the second communication direction is opposite the first communication direction
308

Communicating with the first UE in the first communication direction on the resource block
312

Communicating with the second UE in the second communication direction on the resource block, wherein the communication with the second UE includes supplemental control information
316

Figure 3

ENHANCED CONTROL SIGNALING USING FULL-DUPLEX COMMUNICATION IN WIRELESS COMMUNICATION NETWORK

CROSS REFERENCE TO RELATED APPLICATIONS

This application is a national phase entry under 35 U.S.C. § 371 of International Application No. PCT/US2018/025727, filed Apr. 2, 2018, entitled "ENHANCED CONTROL SIGNALING USING FULL-DUPLEX COMMUNICATION IN WIRELESS COMMUNICATION NETWORK," the entire disclosure of which is hereby incorporated by reference.

FIELD

Embodiments of the present disclosure generally relate to the field of wireless communication networks, and more particularly, to apparatuses, systems, and methods associated with enhanced control signaling using full-duplex communication in wireless communication networks.

BACKGROUND

In a wireless cellular network (e.g., a network standardized by the Third Generation Partnership Project (3GPP), such as Long Term Evolution (LTE), LTE Advanced (LTE-A), or the like), control signaling that includes feedback information is transmitted from the user equipment (UE) to the base station and from the base station to the UE. The feedback information is transmitted in a dedicated physical uplink control channel (PUCCH) or physical downlink control channel (PDCC).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates an example operation flow/algorithmic structure in accordance with some embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array ("FPGA") an application specific integrated circuit ("ASIC"), etc.), discrete circuits, combinational logic circuits, system on a chip, SOC, system in a package, SiP, that provides the described functionality. In some embodiments, the circuitry may execute one or more software or firmware modules to provide the described functions. In some embodiments, circuitry may include logic, at least partially operable in hardware.

Embodiments of the present disclosure describe methods, apparatuses, and systems for enhanced control signaling using full-duplex communication in wireless communication networks. A base station may schedule a first user equipment (UE) for primary access to a set of time-frequency resources in a first communication direction (e.g., uplink or downlink). The base station may additionally schedule a second UE for secondary access to the same set of time-frequency resources in a second communication direction that is the opposite of the first communication direction. The secondary access may be used to communicate supplemental control information, such as a channel quality indicator (CQI) and/or modulation and coding scheme (MCS) feedback, hybrid automatic repeat request (HARQ) feedback, and/or multiple input multiple output (MIMO) feedback (e.g., including a rank indicator (RI) and/or a pre-coding matrix indicator (PMI).

Figure 1:
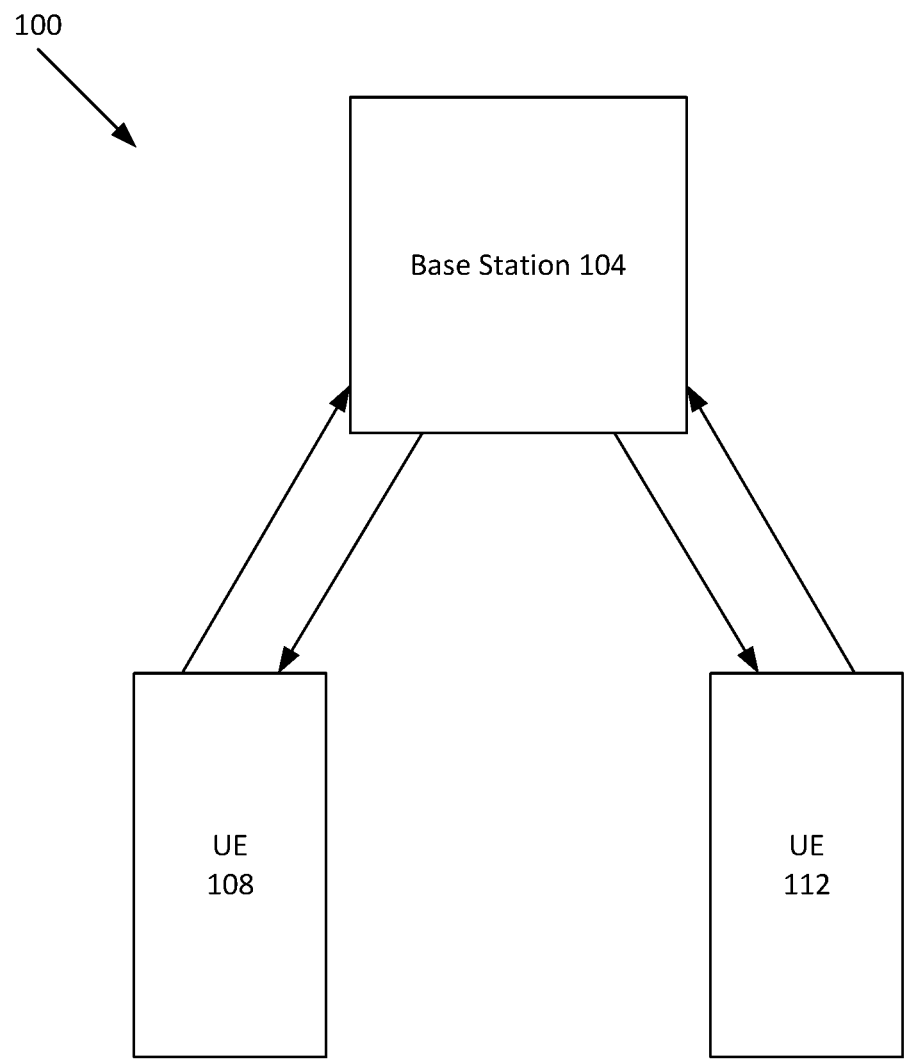
FIG. 1 schematically illustrates a network environment in accordance with some embodiments.

FIG. 1 illustrates a network environment 100 in accordance with various embodiments. Network environment 100 may include a base station 104 and a plurality of user equipments (UEs), including UE 108 and UE 112. The base station 104 may also be referred to as an access node (AN), NodeB, evolved NodeB ("eNB"), next Generation NodeB ("gNB"), RAN node, Road Side Unit ("RSU"), and so forth, and can comprise a ground station (e.g., a terrestrial access point) or a satellite station providing coverage within a geographic area (e.g., a cell). An RSU may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU."

In some embodiments, the RAN may be a next generation ("NG") radio access network ("RAN"), in which case the base station 104 may be a gNB that communicates with the respective UE 108 or 112 using a new radio ("NR") access technology.

The UE 108 and/or UE 112 may be any mobile or non-mobile computing device that is connectable to one or more cellular networks. For example, the UE 108 and/or 112 may be a smartphone, a laptop computer, a desktop computer, a vehicular computer, a smart sensor, etc. In some embodiments, the UE 108 and/or 112 may be an Internet of Things ("IoT") UE, which may include a network access layer designed for low-power IoT applications utilizing short-lived UE connections. An IoT UE can utilize technologies such as machine-to-machine ("M2M") or machine-type communications ("MTC") for exchanging data with an MTC server or device via a public land mobile network ("PLMN"), Proximity-Based Service ("ProSe") or device-to-device ("D2D") communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

In accordance with some embodiments, the UE 108 and/or 112 can be configured to communicate using Orthogonal Frequency-Division Multiplexing ("OFDM") communication signals with the base station 104 over a multicarrier communication channel in accordance with various communication techniques, such as, but not limited to, an Orthogonal Frequency-Division Multiple Access ("OFDMA") communication technique (for example, for downlink communications) or a Single Carrier Frequency Division Multiple Access ("SC-FDMA") communication technique (for example, for uplink or sidelink communications), although the scope of the embodiments is not limited in this respect. The OFDM signals can comprise a plurality of orthogonal subcarriers.

In some embodiments, a downlink resource grid can be used for downlink transmissions from the base station 104 to the UE 108 and/or 112, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical channels that are conveyed using such resource blocks.

A physical downlink shared channel (PDSCH) and physical uplink shared channel (PUSCH) may carry user data and high-layer signaling (for example, radio resource control (RRC) signaling messages). Physical downlink control channel (PDCCH) may carry downlink control information about, for example, the transport format and resource allocations related to the PDSCH/PUSCH channel, among other things. A PDCCH may also inform the UE 108 and/or 112 about the transport format, resource allocation, and HARQ (Hybrid Automatic Repeat Request) information related to the PUSCH. A physical uplink control channel (PUCCH) may carry uplink control information about, for example, HARQ acknowledgement/negative acknowledgement (ACK/NACK), multiple-input, multiple-output (MIMO) feedback such as rank indicator and precoding matrix, channel quality indicators (CQIs), etc.

The UEs 108 and/or 112 may communicate with the base station 104 using any suitable duplexing scheme, such as frequency-division duplexing (FDD) and/or time-division duplexing (TDD) to separate uplink resource blocks from downlink resource blocks. For example, FIGS. 2A, 2B, 2C and 2D illustrate radio frame formats that may be used in various aspects.

Figure 2A:
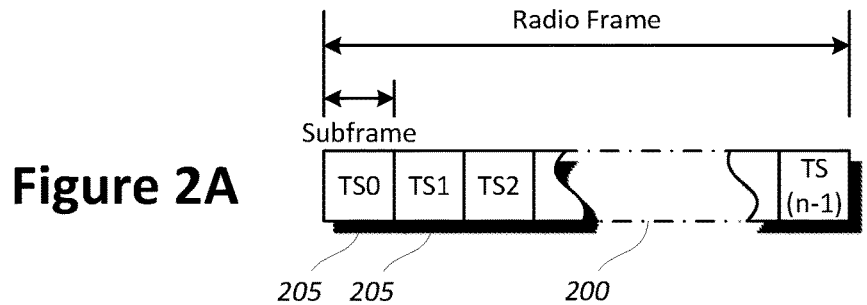
FIG. 2A illustrates a radio frame in accordance with some embodiments.

FIG. 2A illustrates a periodic radio frame structure 200 that may be used in various aspects. Radio frame structure 200 has a predetermined duration and repeats in a periodic manner with a repetition interval equal to the predetermined duration. Radio frame 200 is divided into two or more subframes 205. Each subframe may include a plurality of resource elements arranged in one or more resource blocks.

In an aspect, subframes 205 may be of predetermined duration which may be unequal. In an alternative aspect, subframes 205 may be of a duration which is determined dynamically and varies between subsequent repetitions of radio frame 200.

Figure 2B:
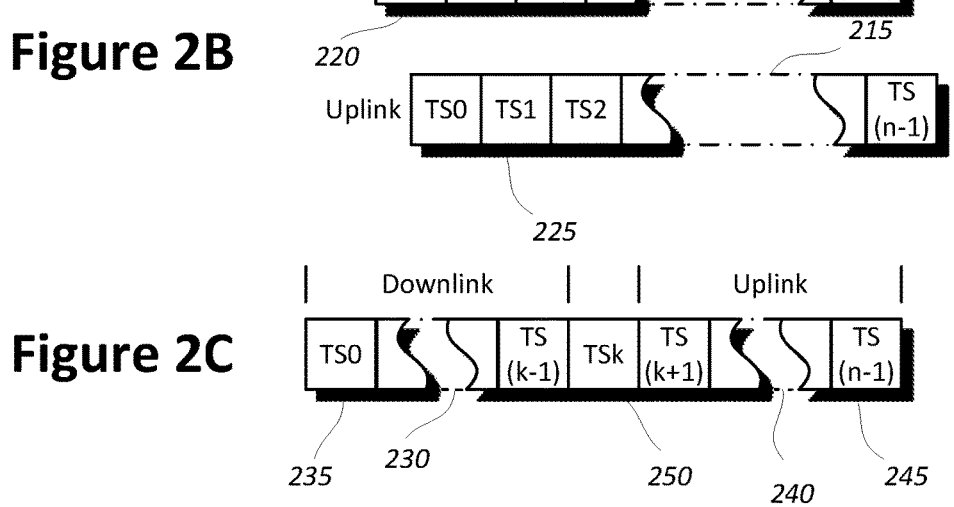
FIG. 2B illustrates a radio frame format for frequency-division duplexing (FDD) in accordance with various embodiments.

FIG. 2B illustrates an aspect of a periodic radio frame structure using FDD. In an aspect of FDD, downlink radio frame 210 is transmitted by a base station to one or more UEs, and uplink radio frame 215 is transmitted by a combination of one or more UEs to a base station. The downlink radio frame 210 is separated in the frequency domain from the radio frame 215 (e.g., by a guard band). However, the downlink radio frame 210 and uplink radio frame 215 may be transmitted at the same time. The downlink radio frame 210 may include a plurality of subframes 220, and the uplink radio frame may include a plurality of subframes 225.

Figure 2C:
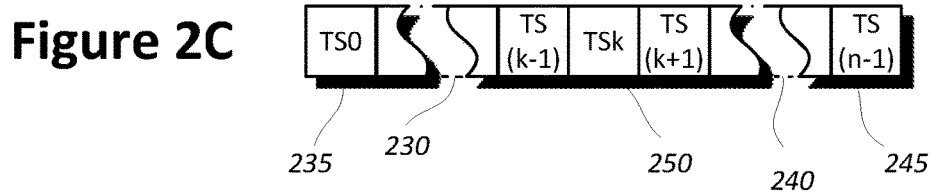
FIG. 2C illustrates a radio frame format for time-division duplexing (TDD) in accordance with various embodiments.

FIG. 2C illustrates an aspect of a periodic radio frame structure using TDD. In an aspect of TDD, the radio frame may include a downlink frame 230 that includes one or more downlink subframes 235 and an uplink frame 240 that includes one or more uplink subframes 245. The downlink frame 230 and uplink frame 240 may be transmitted using the same frequency band at different times. The downlink frame 230 and uplink frame 240 may be separated in time by a guard period 250.

Figure 2D:
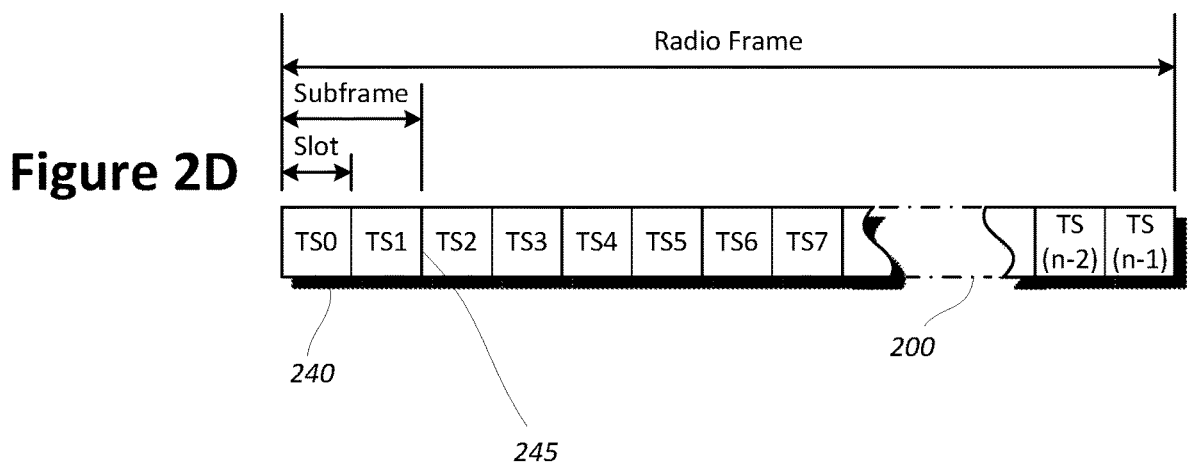
FIG. 2D illustrates another radio frame format for TDD in accordance with various embodiments.

A further example of a radio frame structure that may be used in some aspects is shown in FIG. 2D. In this example, radio frame 260 has a duration of 10 ms. Radio frame 260 is divided into slots 240 each of duration 0.5 milliseconds (ms), and numbered from 0 to 19. Additionally, each pair of adjacent slots 240 numbered 2i and 2i+1, where i is an integer, is referred to as a subframe 245.

In some aspects using the radio frame format of FIG. 2D, each subframe may include a combination of one or more of downlink control information, downlink data information, uplink control information and uplink data information. Accordingly, the radio frame format of FIG. 2D may employ TDD. The combination of information types and direction may be selected independently for each subframe.

In typical networks, the uplink resource elements and/or resource blocks are dedicated to uplink signaling from one or more UEs (e.g., UE 108 and/or UE 112) to the base station 104, and downlink resource elements and/or resource blocks are dedicated to downlink signaling from the base station 104 to one or more UEs (e.g., UE 108 and/or UE 112).

However, various embodiments described herein enable a UE (e.g., UE 108 and/or UE 112) to be scheduled for primary access to one or more resource blocks in one communication direction (e.g., uplink or downlink), and for another UE (or the same UE if the UE is capable of full-duplex communication) to be scheduled for secondary access to the same resource blocks in the opposite communication direction. The secondary access may be used to communicate supplementary control information. The supplementary control information may include, for example, a CQI and/or MCS feedback, HARQ feedback, and/or MIMO feedback (e.g., including a rank indicator (RI) and/or a pre-coding matrix indicator (PMI)). In some embodiments, the eNB 104 may indicate, in the scheduling grant that schedules the other UE for secondary access or in another message (e.g., an RRC message), the type or types of supplementary control information to be communicated in the scheduled secondary access.

For example, the eNB 104 may schedule the UE 108 for primary access to a resource block for downlink communication from the eNB 104 to the UE 108. The eNB 104 may further schedule the UE 112 for secondary access to the resource block for uplink communication of supplemental control information from the UE 112 to the eNB 104. Accordingly, the eNB 104 may transmit downlink signaling to the UE 108 on the resource elements of the resource block and may receive supplemental control information from the UE 112 on the same resource elements.

A resource block in which primary access is given to downlink signaling may be referred to as a downlink resource block. The downlink signaling transmitted by the eNB 104 to the UE 108 on the downlink resource block may proceed as normal for a downlink resource block, and may include any suitable information, such as data (e.g., a physical downlink shared channel (PDSCH)) and/or control information (e.g., a physical downlink control channel (PDCCH).

Alternatively, the eNB 104 may schedule the UE 108 for primary access to a resource block for uplink communication from the UE 108 to the eNB 104. The eNB 104 may further schedule the UE 112 for secondary access to the resource block for downlink communication of supplemental control information from the eNB 104 to the UE 112. Accordingly, the eNB 104 may receive uplink signaling from the UE 108 on the resource elements of the resource block and may transmit supplemental control information from the UE 112 on the same resource elements.

A resource block in which primary access is given to uplink signaling may be referred to as an uplink resource block. The uplink signaling transmitted by the UE 108 to the eNB 104 may proceed as normal, and may include any suitable information, such as data (e.g., a physical uplink shared channel (PUSCH)) and/or control information (e.g., a physical uplink control channel (PUCCH).

In some embodiments, the supplemental control information may be sent with a relatively low MCS and/or transmission power. For example, in some embodiments, the lowest available MCS may be used for the supplemental control information. Additionally, or alternatively, the MCS and/or transmission power for the supplemental control information may be less than the MCS and/or transmission power of the primary access transmission in the opposite communication direction on the same time-frequency resources. Additionally, or alternatively, the MCS and/or transmission power for the supplemental control information may be less than the MCS and/or transmission power of the primary access transmission by the same device (e.g., base station or UE) in the next primary access scheduling grant.

The one or more resource blocks allocated to the UEs 104 and 108 may be at least partially overlapping, but may not be completely overlapping in some embodiments (e.g., based on the size of the information that is to be communicated). In other embodiments, the one or more resource blocks may be completely overlapping.

In various embodiments, the supplementary control information may be communicated in addition to communication of the same types of control information during scheduled primary access. Providing secondary access to time-frequency resources in the opposite communication direction for exchange of supplemental control information may enable the control information to be exchanged more often (allowing for a quicker response to the control information and/or use of more recent/accurate information). Additionally, or alternatively, the supplemental control information exchanged during the secondary access may enable reduction of the frequency (e.g., periodicity) and/or amount of control information that is communicated during primary access, thereby enabling more data to be communicated. Accordingly, the techniques described herein may increase network throughput and/or reduce latency.

For example, as discussed above, when the UE 112 is scheduled for uplink secondary access, the UE 112 may transmit its CQI to the base station 104 via secondary access in a downlink resource block. The UE 112 may additionally or alternatively transmit an MCS estimate to indicate an MCS level suggested by the UE 112. The UE 112 may generate a new/updated CQI and/or MCS estimate for transmission in the scheduled uplink secondary access (e.g., different from the CQI and/or MCS estimate that may have been previously transmitted during a scheduled uplink primary access). The base station 104 may use the CQI and/or MCS estimate to select the proper MCS for a subsequently scheduled downlink primary access for the UE 112. Accordingly, the CQI and/or MCS estimate provided in the uplink secondary access may enable faster link adaptation. Additionally, or alternatively, the base station 104 may use the CQI and/or MCS estimate received via the uplink secondary access to enhance the CQI and/or MCS estimate received from the UE 112 via uplink primary access. Furthermore, in some embodiments, the CQI and/or MCS estimate may be exchanged less often or not at all during primary access, thereby enabling more data to be transmitted.

Similarly, when the UE 112 is scheduled for downlink secondary access, the eNB 104 may transmit its CQI and/or MCS level (based on uplink signal quality from the UE 112 to the eNB 104) to the UE 112 via secondary access in an uplink resource block. The CQI and/or MCS level may enable the UE 112 to adjust one or more signaling parameters (e.g., MCS level and/or transmission power) for a subsequent uplink transmission from the UE 112 to the eNB 104 during a scheduled uplink primary access.

The supplementary control information including CQI and/or MCS feedback may be particularly beneficial during a dynamic traffic environment, in which outdated CQI will lead to inaccurate MCS selection and therefore degradation in system performance. The CQI and/or MCS feedback in the supplementary control information may enable fast link adaptation to achieve higher network throughput and/or better reliability.

As discussed above, the supplementary control information may additionally or alternatively include HARQ feedback. The HARQ feedback may include one or more positive acknowledgements (ACK) and/or a negative acknowledgements (NACK) to indicate whether one or more previously transmitted data packets (e.g., a transport block) were successfully received. In some embodiments, the HARQ feedback may be the same (e.g., corresponding to the same data packets) as HARQ feedback that is sent during primary access. Inclusion of the HARQ feedback may enable quicker retransmission of data that was not successfully received (e.g., responsive to a NACK). Additionally, or alternatively, the HARQ feedback in the supplementary control information may enable the repetitions of HARQ feedback in primary access to be reduced.

For example, when the UE 112 is scheduled for uplink secondary access, the UE 112 may transmit its HARQ feedback to the base station 104. The HARQ feedback may indicate whether one or more data packets that were previously transmitted by the base station 104 and intended for the UE 112 were successfully received by the UE 112 or not. If the HARQ feedback includes a NACK to indicate that one or more previously transmitted data packets were not successfully received by the UE 112, the base station 104 may re-transmit the one or more data packets to the UE 112. Accordingly, the HARQ feedback in the supplemental control information may enable quicker re-transmission of the data packet rather than the UE 112 waiting to send the HARQ feedback until its next scheduled uplink primary access.

Similarly, when the UE 112 is scheduled for downlink secondary access, the base station 104 may transmit HARQ feedback to the UE 112 that indicates whether one or more uplink data packets that were previously transmitted by the UE 112 were successfully received by the base station 104. If the HARQ feedback includes a NACK, then the UE 112 may re-transmit the one or more data packets responsive to the NACK.

As discussed above, another example of information that may be included in the supplemental control information is MIMO feedback. The MIMO feedback may be particularly suited for uplink secondary access, in which the UE 112 transmits the supplemental control information to the eNB 104. The MIMO feedback may include, for example, an RI and/or a PMI. The base station 104 may use the MIMO feedback to determine one or more signaling parameters (e.g. transmission rank and/or pre-coding matrix) for a downlink MIMO transmission. The downlink MIMO transmission may be a multi-user MIMO transmission that includes signaling (e.g., beams) for multiple UEs, including the UE 112. The base station 104 may apply beamforming (e.g., including a pre-coding matrix) to the different beams for each UE based on the received MIMO feedback. The inclusion of the MIMO feedback in the supplemental control information enables the base station 104 to use more recent MIMO feedback, which may reduce inter-beam interference, increase network throughput, and/or enable an increase in the number of serving UEs.

Beamforming may be especially beneficial in 5G systems that use high frequency communications, for example, millimeter wave ("mmWave") communications, although beamforming is not limited to high frequency communications. As used herein, mmWave communications may be communications using a wavelength between 1 and 10 millimeters, which corresponds to a range of frequency spectrum between 30 and 300 gigahertz. Antenna elements used in mmWave systems may be small enough for multiple elements to be implemented in the relatively small form factors typically employed by UEs. Furthermore, beamforming may help to mitigate at least some of the mmWave challenges resulting from, for example, path loss, line-of-sight, and transmission range issues.

In various embodiments, the eNB 104 may manage scheduling of its serving UEs for primary access and/or secondary access to resource blocks. In some embodiments, the eNB 104 may maintain a list of UEs that are to be scheduled for uplink primary access and downlink primary access, as well as a list of UEs that are eligible for downlink secondary access and uplink secondary access. In some embodiments, the set of UEs that are eligible for downlink secondary access may be the complement of the set of UEs that are to be scheduled for uplink primary access. Additionally, the set of UEs that are eligible for uplink secondary access may be the complement of the set of UEs that are scheduled for downlink primary access. For example, Table 1 below illustrates one example of UE lists that may be maintained by the eNB 104, for a situation in which seven UEs (e.g., UE1, UE2, . . . UE7) are associated with (e.g., in a radio resource control (RRC) Connected mode) the eNB 104. The UEs in Table 1 may correspond to the UEs 108 and/or 112 in FIG. 1.

TABLE 1

| Uplink Primary Access | Downlink Primary Access |
|---|---|
| {UE1, UE2, UE3} | {UE4, UE5, UE6} |
| Downlink Secondary Access | Uplink Secondary Access |
| {UE4, UE5, UE6, UE7} | {UE1, UE2, UE3, UE7} |

As shown, the UEs that are scheduled for uplink primary access may not be eligible for downlink secondary access on the same time-frequency resources, and UEs that are scheduled for downlink primary access may not be eligible for uplink secondary access on the same resource block. However, some embodiments may enable UEs (e.g., UEs that are capable of full-duplex communication) to have primary and secondary access to the same resource block. The lists in Table 1 may be updated over time (e.g., every resource block, every subframe, or every few subframes).

In some embodiments, the scheduler of the base station 104 may schedule the UEs for primary access (uplink or downlink) first. For example, the scheduler of the base station 104 may loop through each resource block (e.g., sub-band or sub-frame) to schedule a UE from the primary access list. The UEs may be scheduled for primary access based on a scheduling metric, such as proportional-fair scheduling, max-min scheduling, etc.

Then, for each resource block, the base station 104 may select one or more of the UEs on the corresponding secondary access list to be scheduled for secondary access. The UEs for secondary access may be selected based on one or more scheduling rules. For example, the base station may select the UE from the corresponding secondary access list that has a lowest UE-UE interference with the UE that was selected for primary access on the same time-frequency resources.

To provide one example based on Table 1, the base station may select UE4 for downlink primary access in a resource block, e.g., based on UE4 having the highest scheduling metric among the UEs on the downlink primary access list. The base station may determine the UE-UE interference between UE4 and each of the UEs on the secondary access list (e.g., based on measurements made by the base station and/or by the UEs). The base station may schedule the UE having the lowest determined UE-UE interference (e.g., UE 1) for uplink secondary access in the same resource block. The base station may transmit data and/or control information to UE4 in the resource block and may also receive uplink supplemental control information from UE1 in the same resource block.

In other embodiments, the UE for secondary access may be selected based on one or more performance metrics of the UEs that are eligible for secondary access and/or a scheduling metric that jointly reflects the UE-UE interference level and one or more other performance metrics. For example, for uplink secondary access, the scheduling metric may reflect the data rate and/or a latency requirement of the UE. In one example, the UE may be selected for uplink secondary access that has the shortest (more stringent) latency requirement (or the highest data rate, or some combination of both) among all the eligible UEs that have a UE-UE interference with the UE selected for primary access that is below a threshold.

As another example, for downlink secondary access, the UE may be selected based on the channel quality, quality of service (QoS) requirement, or latency requirement of the UEs eligible for downlink secondary access. For example, the UE from the downlink secondary access list that has the highest channel quality, highest QoS requirement, and/or shortest latency requirement may be selected. The UE may be selected with or without regard to the UE-UE interference with the UE that is selected for uplink primary access on the same time-frequency resources.

In some embodiments, the eNB 104 may designate some resource blocks (e.g., subframes) for full-duplex communications as described herein, and may designate other resource blocks for half-duplex communications (e.g., primary access only, no secondary access). The designated half-duplex resources may be beneficial for UEs that may not be able to successfully send or receive transmissions when full-duplex communications are enabled. The partitioning of full-duplex resources and half-duplex resources may be pre-determined or determined dynamically (e.g., based on traffic loading, interference level, etc.) by the central network controller or the base station 104.

FIG. 3 illustrates an operation flow/algorithmic structure 300 in accordance with some embodiments. The operation flow/algorithmic structure 300 may be performed by a base station (e.g., the base station 104) or circuitry therein in accordance with various embodiments.

The operation flow/algorithmic structure 300 may include, at 304, scheduling a first UE (e.g., UE 108) for primary access in a first communication direction on a resource block of a wireless communication network. At 308, the operation flow/algorithmic structure 300 may further include scheduling a second UE (e.g., UE 112) for secondary access in a second communication direction on the resource block. The second communication direction is opposite the first communication direction. For example, the first communication direction may be downlink and the second communication direction may be uplink. Alternatively, the first communication direction may be uplink and the second communication direction may be downlink.

The operation flow/algorithmic structure 300 may further include, at 312, communicating with the first UE in the first communication direction on the resource block. At 316, the operation flow/algorithmic structure 300 may include communicating with the second UE in the second communication direction on the resource block, wherein the communication with the second UE includes supplemental control information. For example, the supplemental control information may include a CQI and/or MCS feedback, HARQ feedback, and/or MIMO feedback (e.g., including a rank indicator and a pre-coding matrix indicator).

When the second communication direction is downlink, the operation flow/algorithmic structure 300 may further include generating the supplemental control information. Communicating with the second UE at 316 may include transmitting the generated supplemental control information to the second UE on the set of time-frequency resources.

When the second communication direction is uplink, communicating with the second UE at 316 may include receiving the supplemental control information on the resource block. The operation flow/algorithmic structure 300 may further include modifying one or more communication parameters with the second UE (e.g., for a subsequent downlink transmission in a primary downlink scheduling grant) based on the received supplemental control information.

Figure 4:
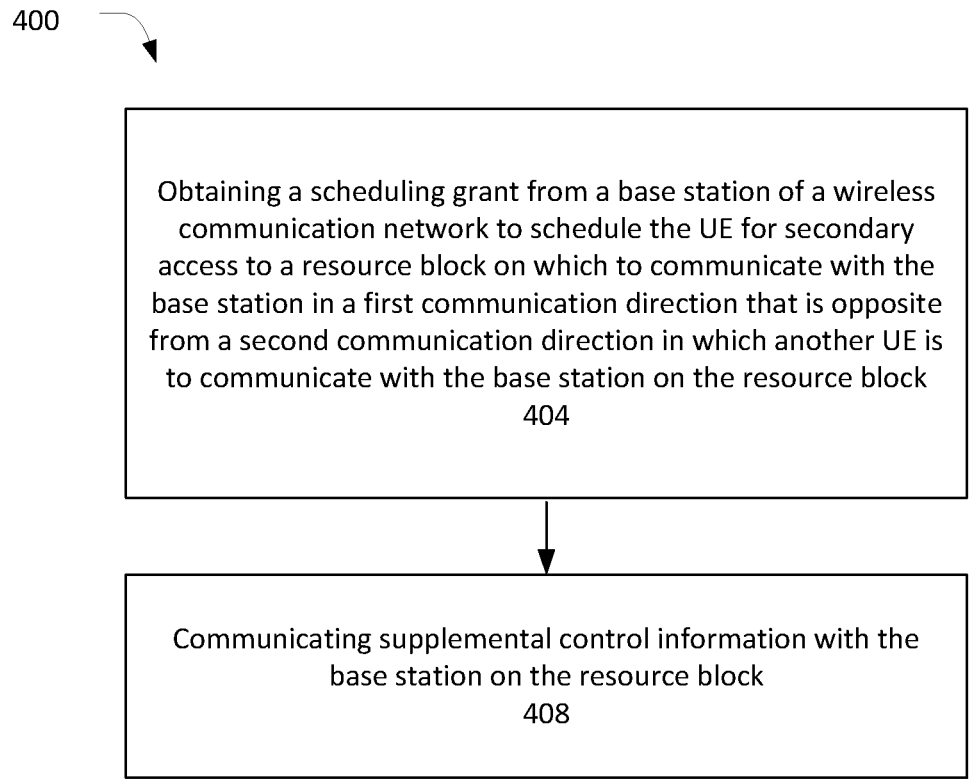
FIG. 4 illustrates an example operation flow/algorithmic structure in accordance with some embodiments.

FIG. 4 illustrates an operation flow/algorithmic structure 400 in accordance with some embodiments. The operation flow/algorithmic structure 400 may be performed by a UE (e.g., the UE 108 and/or 112) or circuitry therein in accordance with various embodiments.

The operation flow/algorithmic structure 400 may include, at 404, obtaining a scheduling grant from a base station of a wireless communication network to schedule the UE for secondary access to a resource block on which to communicate with the base station in a first communication direction that is opposite from a second communication direction in which another UE is to communicate with the base station on the resource block. For example, the first communication direction may be downlink and the second communication direction may be uplink. Alternatively, the first communication direction may be uplink and the second communication direction may be downlink.

The operation flow/algorithmic structure 400 may further include, at 408, communicating supplemental control information with the base station on the resource block. For example, the supplemental control information may include a CQI and/or MCS feedback, HARQ feedback, and/or MIMO feedback (e.g., including a rank indicator and a pre-coding matrix indicator).

When the first communication direction is uplink, the operation flow/algorithmic structure 400 may further include generating the supplemental control information. Communicating the supplemental control information at 408 may include transmitting the generated supplemental control information to the second UE on the resource block.

When the second communication direction is downlink, communicating the supplemental control information at 408 may include receiving the supplemental control information from the base station on the resource block. The operation flow/algorithmic structure 400 may further include modifying one or more communication parameters of the UE (e.g., for a subsequent uplink transmission in a primary access scheduling grant) based on the received supplemental control information.

Figure 5:
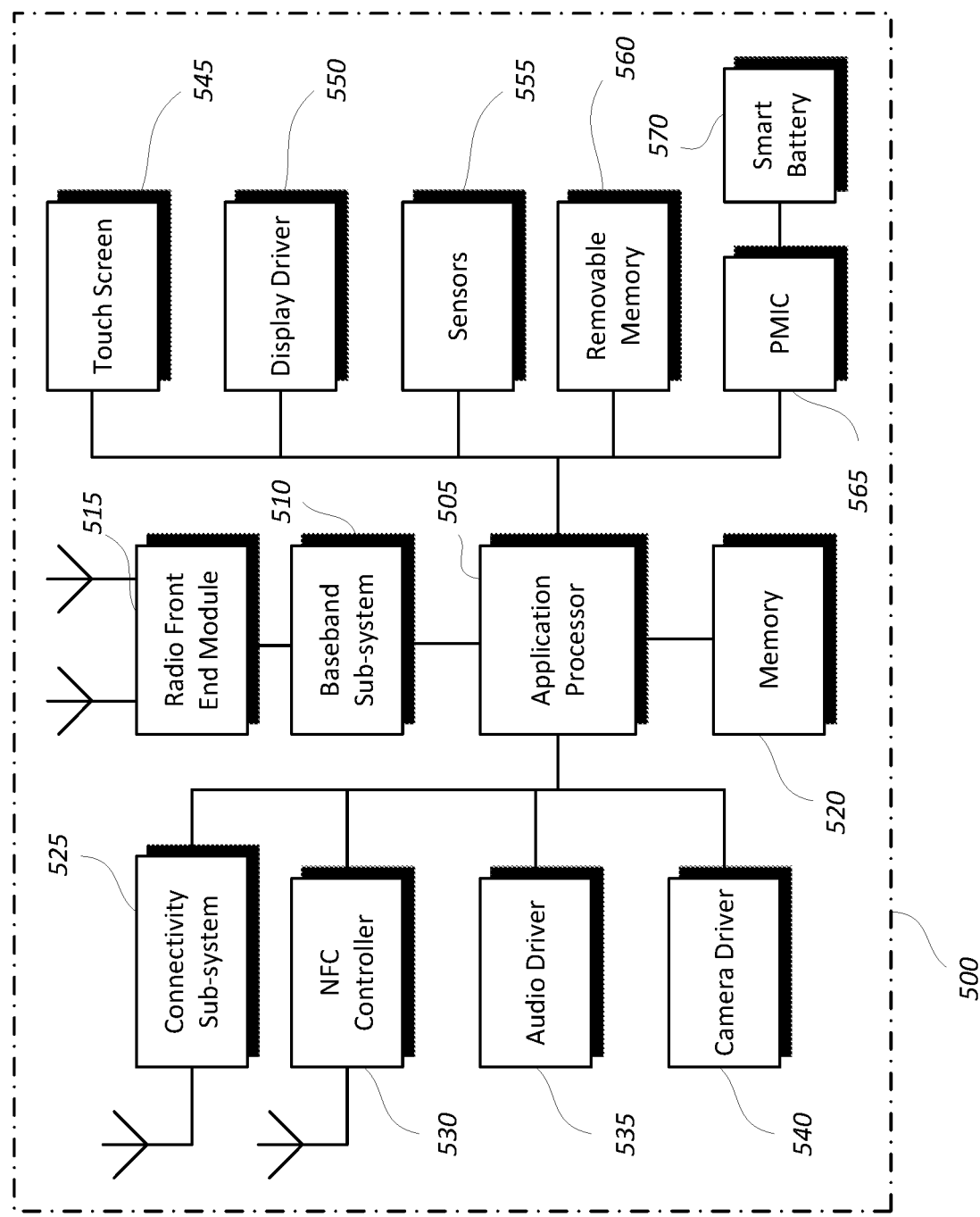
FIG. 5 illustrates a user equipment (UE) in accordance with some embodiments.

Embodiments described herein may be implemented into a system using any suitably configured hardware and/or software. FIG. 5 illustrates a user device 500 in accordance with an aspect. The user device 500 may correspond to the UE 108 and/or 112, and/or may be configured to implement the operation flow/algorithmic structure 400. The user device 500 may be a mobile device in some aspects and includes an application processor 505, baseband processor 510 (also referred to as a baseband sub-system), radio front end module (RFEM) 515, memory 520, connectivity subsystem 525, near field communication (NFC) controller 530, audio driver 535, camera driver 540, touch screen 545, display driver 550, sensors 555, removable memory 560, power management integrated circuit (PMIC) 565 and smart battery 570.

In some aspects, application processor 505 may include, for example, one or more CPU cores and one or more of cache memory, low drop-out voltage regulators (LDOs), interrupt controllers, serial interfaces such as serial peripheral interface (SPI), inter-integrated circuit (VC) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 510 may be implemented, for example, as a solder-down substrate including one or more integrated circuits, a single packaged integrated circuit soldered to a main circuit board, and/or a multi-chip module containing two or more integrated circuits.

Figure 6:
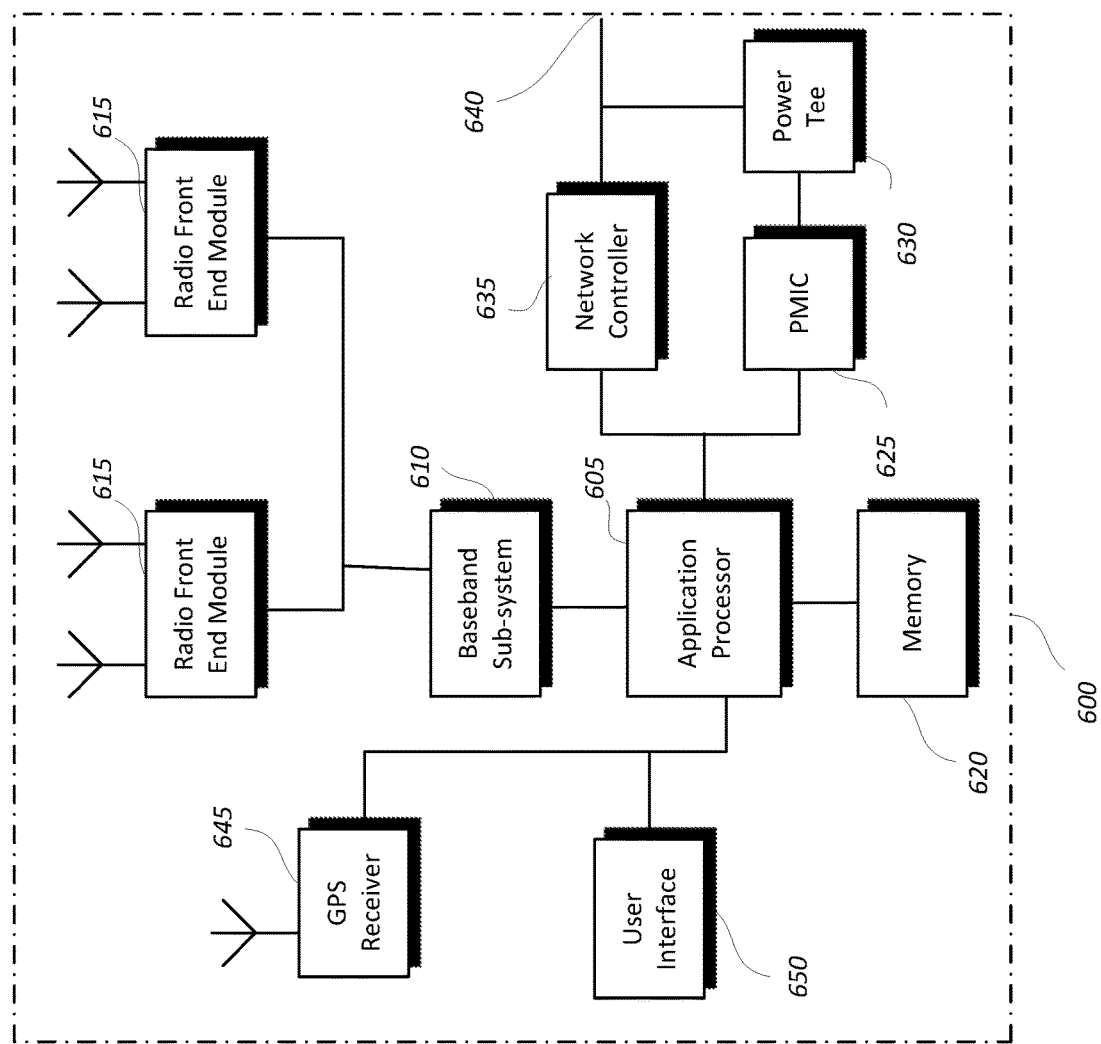
FIG. 6 illustrates a base station radio head in accordance with some embodiments.

FIG. 6 illustrates a base station or infrastructure equipment radio head 600 in accordance with an aspect. The base station radio head 600 may correspond to the base station 104 and/or be configured to implement the operation flow/algorithmic structure 300. The base station radio head 600 may include one or more of application processor 605, baseband processor 610, one or more radio front end modules 615, memory 620, power management circuitry 625, power tee circuitry 630, network controller 635, network interface connector 640, satellite navigation receiver 645, and user interface 650.

In some aspects, application processor 605 may include one or more CPU cores and one or more of cache memory, low drop-out voltage regulators (LDOs), interrupt controllers, serial interfaces such as SPI, FC or universal programmable serial interface, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, baseband processor 610 may be implemented, for example, as a solder-down substrate including one or more integrated circuits, a single packaged integrated circuit soldered to a main circuit board or a multi-chip module containing two or more integrated circuits.

In some aspects, memory 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 620 may be implemented as one or more of solder down packaged integrated circuits, socketed memory modules and plug-in memory cards.

In some aspects, power management integrated circuitry 625 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 630 may provide for electrical power drawn from a network cable to provide both power supply and data connectivity to the base station radio head 600 using a single cable.

In some aspects, network controller 635 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 645 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 645 may provide data to application processor 605 which may include one or more of position data or time data. Application processor 605 may use time data to synchronize operations with other radio base stations.

In some aspects, user interface 650 may include one or more physical or virtual buttons, such as a reset button, one or more indicators such as light emitting diodes (LEDs) and a display screen.

Figure 7:
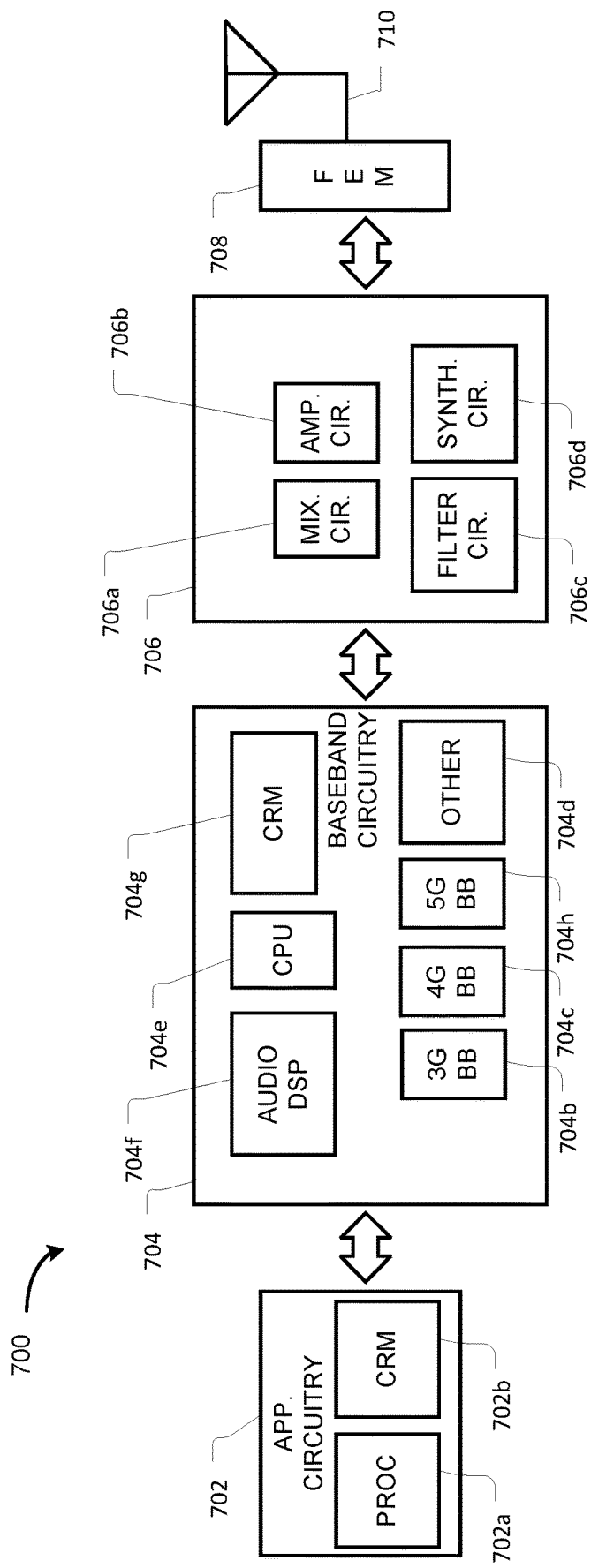
FIG. 7 illustrates an electronic device in accordance with some embodiments.

FIG. 7 illustrates, for one embodiment, example details of various components of an electronic device 700. In some embodiments, the electronic device 700 may be, implement, be incorporated into, or otherwise be a part of a UE (e.g., the UE 108, UE 112, and/or user device 500) and/or a base station (e.g., base station 104 and/or base station radio head 600). The electronic device 700 may include application circuitry 702, baseband circuitry 704, Radio Frequency (RF) circuitry 706, front-end module (FEM) circuitry 708 and one or more antennas 710, coupled together at least as shown. In embodiments where the electronic device 700 is implemented in or by a base station, the electronic device 700 may also include network interface circuitry (not shown) for communicating over a wired interface (for example, an X2 interface, an S1 interface, and the like).

The application circuitry 702 may include one or more application processors. For example, the application circuitry 702 may include circuitry such as, but not limited to, one or more single-core or multi-core processors 702a. The processor(s) 702a may include any combination of general-purpose processors and dedicated processors (e.g., graphics processors, application processors, etc.). The processors 702a may be coupled with and/or may include computer-readable media 702b (also referred to as "CRM 702b", "memory 702b", "storage 702b", or "memory/storage 702b") and may be configured to execute instructions stored in the CRM 702b to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband circuity 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, and the like. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In various embodiments, baseband circuitry 704 may implement one or more aspects of the techniques described herein (e.g., the operation flow/algorithmic structure 300, operation flow/algorithmic structure 400, and/or techniques described with respect to base station 104, UE 108, and/or UE 112).

In some embodiments, the baseband circuitry may include one or more audio digital signal processor(s) (DSP) 704f. The audio DSP(s) 704f may include elements for compression/decompression and echo cancellation and may include other suitable processing elements in other embodiments. The baseband circuitry 704 may further include computer-readable media 704g (also referred to as "CRM 704g", "memory 704g", "storage 704g", or "memory/storage 704b"). The CRM 704g may be used to load and store data and/or instructions for operations performed by the processors of the baseband circuitry 704. For example, the CRM 704g may load and store data and/or instructions that, when executed by one or more processors of the baseband circuitry 704, cause the baseband circuitry 704 to implement the techniques described herein, such as aspects of the operation flow/algorithmic structure 300 and/or operation flow/algorithmic structure 400.

CRM 704g for one embodiment may include any combination of suitable volatile memory and/or non-volatile memory. The CRM 704g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 704g may be shared among the various processors or dedicated to particular processors. Components of the baseband circuitry 704 may be suitably combined in a single chip, a single chipset, or disposed on a same circuit board in some embodiments. In some embodiments, some or all of the constituent components of the baseband circuitry 704 and the application circuitry 702 may be implemented together, such as, for example, on a system on a chip (SOC).

In some embodiments, the baseband circuitry 704 may provide for communication compatible with one or more radio technologies. For example, in some embodiments, the baseband circuitry 704 may support communication with an E-UTRAN and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc., to facilitate the communication with the wireless network. RF circuitry 706 may include a receive signal path that may include circuitry to down-convert RF signals received from the FEM circuitry 708 and provide baseband signals to the baseband circuitry 704. RF circuitry 706 may also include a transmit signal path that may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect, as other types of frequency synthesizers may be suitable. For example, synthesizer circuitry 706d may be a delta-sigma synthesizer, a frequency multiplier, or a synthesizer comprising a phase-locked loop with a frequency divider. The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 depending on the desired output frequency. In some embodiments, a divider control input (e.g., N) may be determined from a look-up table based on a channel indicated by the application circuitry 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path that may include circuitry configured to operate on RF signals received from one or more antennas 710, amplify the received signals and provide the amplified versions of the received signals to the RF circuitry 706 for further processing. FEM circuitry 708 may also include a transmit signal path that may include circuitry configured to amplify signals for transmission provided by the RF circuitry 706 for transmission by one or more of the one or more antennas 710. In some embodiments, the FEM circuitry 708 may include a TX/RX switch to switch between transmit mode and receive mode operation. The FEM circuitry 708 may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

As discussed herein, the FEM circuitry 708 may be configured for full-duplex communication (e.g., when implemented in a base station or a full-duplex UE). The FEM circuitry 708 may transmit and receive signals on the same resource elements using the same or different antennas 710.

In some embodiments, the electronic device 700 may include additional elements such as, for example, a display, a camera, one or more sensors, and/or interface circuitry (for example, input/output (I/O) interfaces or buses) (not shown). In embodiments where the electronic device is implemented in or by a base station (e.g., eNB or gNB) or an access point, the electronic device 700 may include network interface circuitry. The network interface circuitry may be one or more computer hardware components that connect electronic device 700 to one or more network elements, such as one or more servers within a core network or one or more other base stations or access points via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

Figure 8:
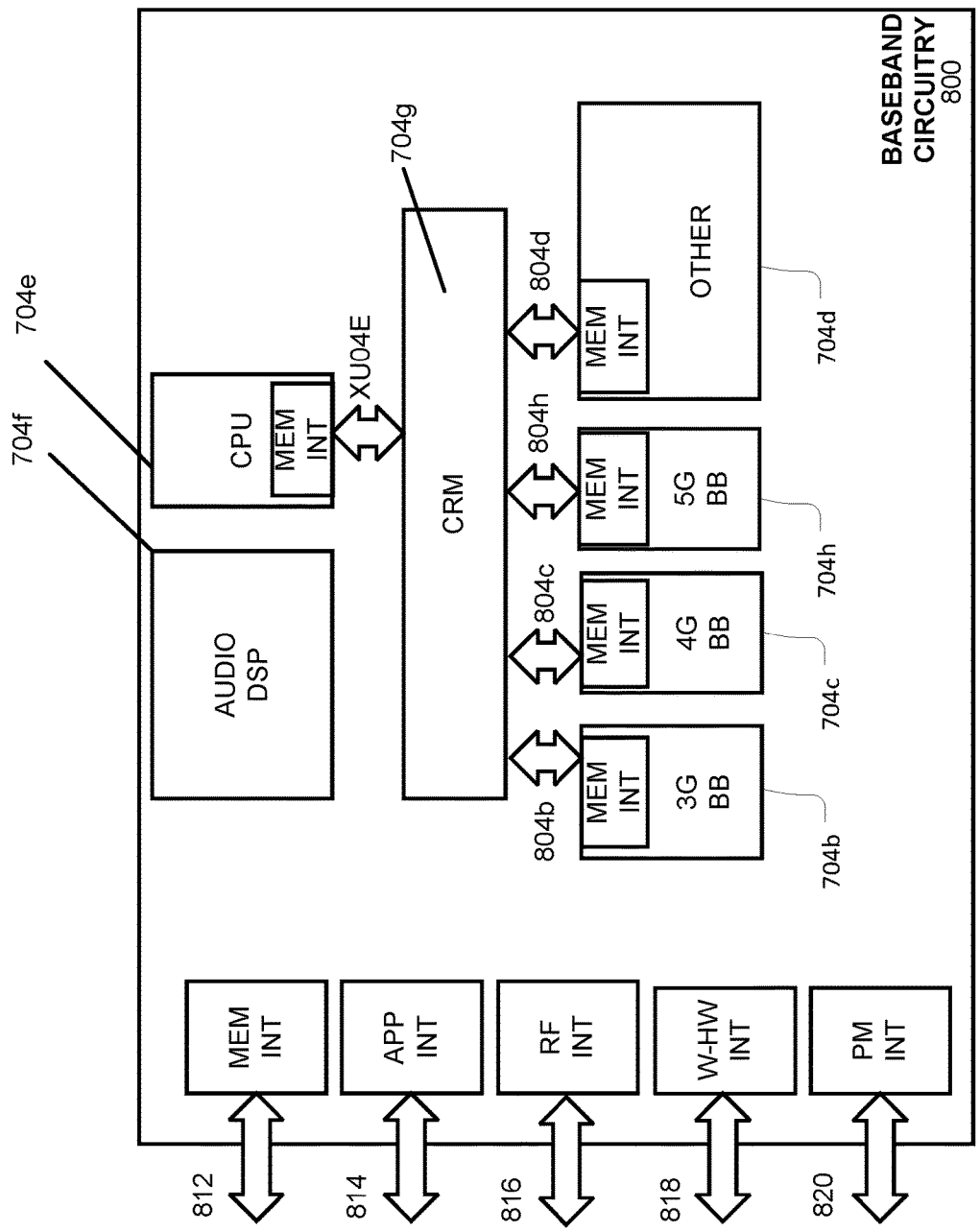
FIG. 8 illustrates baseband circuitry in accordance with some embodiments.

FIG. 8 illustrates example interfaces of baseband circuitry 704 in accordance with some embodiments. As discussed above, the baseband circuitry 704 of FIG. 7 may comprise processors and CRM 704g utilized by said processors. Each of the processors 704b, 704c, 704h, and 704d may include a memory interface, 804*b*, 804*c*, 804*h*, and 804*d*, respectively, to send/receive data to/from the CRM 704*g*.

The baseband circuitry 704 may further include one or more interfaces to communicatively couple to other circuitries/devices, such as a memory interface 812 (for example, an interface to send/receive data to/from memory external to the baseband circuitry 704), an application circuitry interface 814 (for example, an interface to send/receive data to/from the application circuitry 702 of FIG. 7), an RF circuitry interface 816 (for example, an interface to send/receive data to/from RF circuitry 706 of FIG. 7), a wireless hardware connectivity interface 818 (for example, an interface to send/receive data to/from Near Field Communication (NFC) components, Bluetooth® components (for example, Bluetooth® Low Energy), Wi-Fi® components, and other communication components), and a power management interface 820 (for example, an interface to send/receive power or control signals to/from a power management controller.

Figure 9:
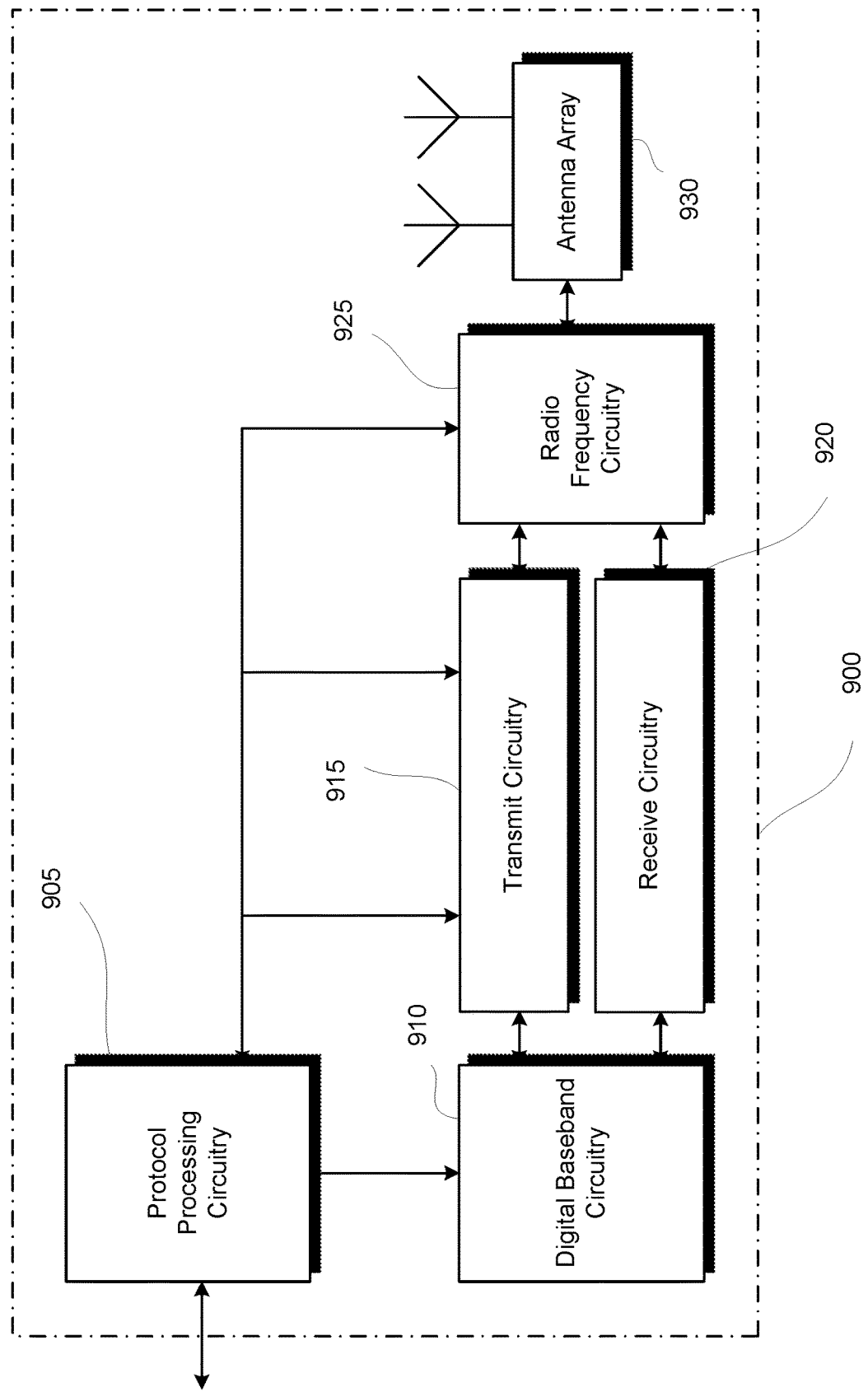
FIG. 9 illustrates communication circuitry in accordance with some embodiments.

FIG. 9 illustrates communication circuitry 900 according to some aspects. Communication circuitry 900 may be similar to, and substantially interchangeable with components of electronic device 700. Components as shown in communication circuitry 900 are shown here for illustrative purposes and may include other components not shown here in FIG. 9.

Communication circuitry 900 may include protocol processing circuitry 905 may correspond to CPU 704*e*, processor 702*a*, etc. The protocol processing circuitry may implement one or more of MAC, RLC, PDCP, RRC and non-access stratum ("NAS") functions of a cellular protocol stack (e.g., CPS 712). Protocol processing circuitry 905 may include one or more processing cores (not shown, but similar to those described elsewhere herein) to execute instructions and one or more memory structures (not shown, but similar to those described elsewhere herein) to store program and data information.

Communication circuitry 900 may further include digital baseband circuitry 910, which may be similar to baseband processors of the baseband circuitry 704. The digital baseband circuitry 910 may implement PHY layer functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

As discussed above, the digital baseband circuitry 910 may implement one or more HARQ functions. According to some aspects, a transmit HARQ process may generate a transport block (TB) to be encoded by the physical layer according to a specified redundancy version (RV), by selecting a MAC-PDU for transmission. According to some aspects, a transmit HARQ process included in a HARQ entity may determine whether to retransmit a previously transmitted TB or to transmit a new TB at a transmit time based on whether a positive acknowledgement (ACK) or a negative acknowledgement (NACK) was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Communication circuitry 900 may further include transmit circuitry 915, receive circuitry 920 and/or antenna array circuitry 930.

Communication circuitry 900 may further include RF circuitry 925, which may correspond to RF circuitry 706 or FEM 708. In an aspect of the invention, RF circuitry 925 may include multiple parallel RF chains for one or more of transmit or receive functions, each connected to one or more antennas of the antenna array 930.

In an aspect of the disclosure, protocol processing circuitry 905 may include one or more instances of control circuitry (not shown) to provide control functions for one or more of digital baseband circuitry 910, transmit circuitry 915, receive circuitry 920, and/or radio frequency circuitry 925.

In some embodiments, communication circuitry 900 may be specifically configured for millimeter wave communications. For example, the communication circuitry 900 may have a hybrid beamforming architecture in which precoding and combining are done in both baseband and RF sections. For example, the digital baseband circuitry 910 may implement a baseband precoder (in transmitter) and combiner (in receiver) using digital signal processing, while RF circuitry 925 may implement RF precoding (in transmitter) and combiner (in receiver) using phase shifters.

Figure 10:
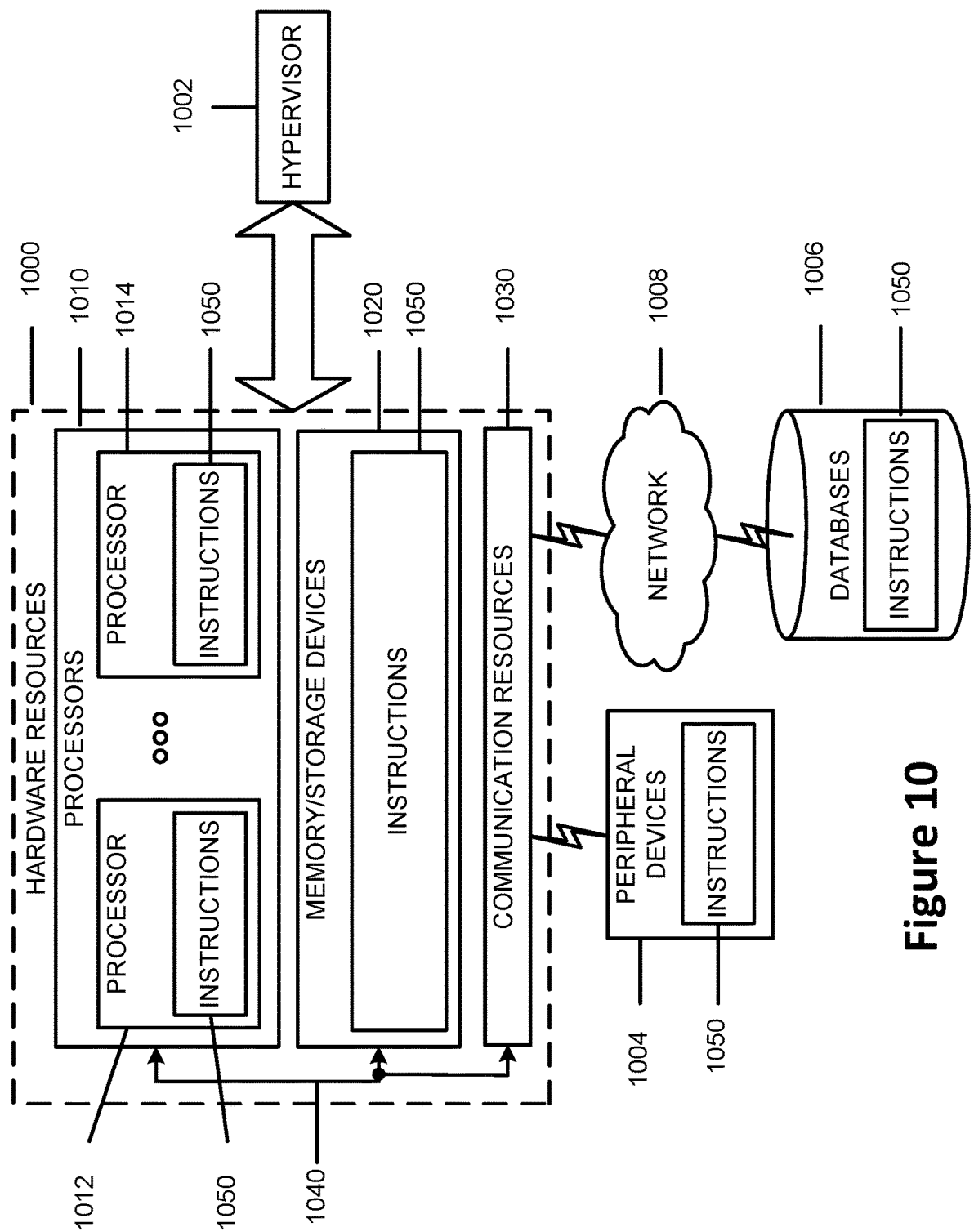
FIG. 10 illustrates hardware resources in accordance with some embodiments.

FIG. 10 is a block diagram illustrating components, according to some example embodiments, able to read instructions from a machine-readable or computer-readable medium (for example, a non-transitory machine-readable storage medium) and perform any one or more of the processes for communicating supplemental control information via a secondary access scheduling grant, as discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (for example, network function virtualization ("NFV")) is utilized, a hypervisor 1002 may be executed to provide an execution environment for one or more network slices/sub-slices to utilize the hardware resources 1000.

The processors 1010 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 1012 and a processor 1014. The processors may correspond to any processors of the base station 104 and/or UEs 108 and/or 112 described herein.

The memory/storage devices 1020 may include main memory, disk storage, or any suitable combination thereof.

The memory/storage devices 1020 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 1020 may correspond to CRM 702*b* of FIG. 7.

The communication resources 1030 may include interconnection or network interface components or other suitable devices to communicate with one or more peripheral devices 1004 or one or more databases 1006 via a network 1008. For example, the communication resources 1030 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein.

The instructions 1050 may cause the processors 1010 to perform the operation flow/algorithmic structure 300, operation flow/algorithmic structure 400, or other operations of a UE and/or base station described herein.

The instructions 1050 may reside, completely or partially, within at least one of the processors 1010 (for example, within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

The resources described in FIG. 10 may also be referred to as circuitry. For example, communication resources 1030 may also be referred to as communication circuitry 1030.

Some non-limiting Examples of various embodiments are provided below.

Example 1 is one or more computer-readable media having instructions, stored thereon, that when executed by one or more processors of a base station, cause the base station to: schedule a first user equipment (UE) for primary access in a first communication direction on resource elements of a wireless communication network; schedule a second UE for secondary access in a second communication direction on the resource elements, wherein the second communication direction is opposite the first communication direction; communicate with the first UE in the first communication direction on the resource elements; and communicate with the second UE in the second communication direction on the resource elements, wherein the communication with the second UE includes supplemental control information.

Example 2 is the one or more media of Example 1, wherein the supplemental control information includes: a channel quality indicator (CQI); hybrid automatic repeat request (HARQ) feedback; or multiple input multiple output (MIMO) feedback that includes a rank indicator (RI) and a pre-coding matrix indicator (PMI).

Example 3 is the one or more media of Example 2, wherein the first communication direction is downlink, wherein the second communication direction is uplink, wherein the supplemental control information includes the CQI or the MIMO feedback, and wherein the instructions, when executed, further cause the base station to modify, based on the CQI or the MIMO feedback, one or more communication parameters for communication with the second UE in a subsequent downlink primary access grant for the second UE.

Example 4 is the one or more media of Example 2 or Example 3, wherein the first communication direction is downlink, wherein the second communication direction is uplink, wherein the supplemental control information includes the HARQ feedback, wherein the HARQ feedback includes a negative acknowledgement (NACK) to indicate that the second UE did not receive a previously transmitted data packet, and wherein the instructions, when executed, further cause the base station to re-transmit the data packet responsive to the NACK.

Example 5 is the one or more media of any one of Examples 1 to 4, wherein the base station is to communicate with the first UE using a first modulation and coding scheme (MCS) and a first transmission power and is to communicate with the second UE using a second MCS and a second transmission power, wherein the second MCS is at a lower MCS level than the first MCS and the second transmission power is less than the first transmission power.

Example 6 is the one or more media of any one of Examples 1 to 5, wherein the first communication direction is downlink, wherein the second communication direction is uplink, and wherein the instructions, when executed, further cause the base station to select the second UE for secondary access that has a lowest UE-UE interference with the first UE among UEs eligible for secondary access on the resource elements.

Example 7 is the one or more media of any one of Examples 1 to 5, wherein the first communication direction is downlink, wherein the second communication direction is uplink, and wherein the instructions, when executed, further cause the base station to select the second UE for secondary access from among a plurality of eligible UEs that have a UE-UE interference with the first UE that is below a threshold, wherein the second UE is selected from the plurality of eligible UEs based on one or more performance metrics.

Example 8 is the one or more media of Example 7, wherein the one or more performance metrics include a data rate or latency of the plurality of eligible UEs.

Example 9 is the one or more media of Example 1 or any other suitable Example, wherein the first communication direction is uplink, wherein the second communication direction is downlink, and wherein the instructions, when executed, further cause the base station to select the second UE for secondary access based on a channel quality, quality of service requirement, or latency requirement of the second UE.

Example 10 is the one or more media of any one of Examples 1 to 9, wherein the instructions, when executed, further cause the base station to schedule other resource elements for half-duplex communications.

Example 11 is one or more computer-readable media having instructions, stored thereon, that when executed by one or more processors of a user equipment (UE), cause the UE to: obtain a scheduling grant from a base station of a wireless communication network to schedule the UE for secondary access to a set of resource elements on which to communicate with the base station in a first communication direction that is opposite from a second communication direction in which another UE is to communicate with the base station on the set of resource elements; and communicate supplemental control information with the base station on the set of resource elements, wherein the supplemental control information includes: a channel quality indicator (CQI); hybrid automatic repeat request (HARQ) feedback; or multiple input multiple output (MIMO) feedback that includes a rank indicator (RI) and a pre-coding matrix indicator (PMI).

Example 12 is the one or more media of Example 11, wherein the scheduling grant indicates a type of the supplemental control information to be communicated on the set of resource elements.

Example 13 is the one or more media of Example 11 or Example 12, wherein the scheduling grant is a first scheduling grant, wherein the set of resource elements is a first set of resource elements, and wherein the instructions, when executed, further cause the UE to: obtain a second scheduling grant to schedule the UE for primary access on the second set of resource elements; and communicate primary control information with the base station on the second set of resource elements, wherein the primary control information includes at least some of the same information included in the supplemental control information.

Example 14 is the one or more media of any one of Examples 11 to 13, wherein the first communication direction is downlink, wherein the second communication direction is uplink, wherein the supplemental control information includes the HARQ feedback, wherein the HARQ feedback includes a negative acknowledgement (NACK) to indicate that the base station did not receive a previously transmitted data packet, and wherein the instructions, when executed, further cause the UE to re-transmit the data packet responsive to the NACK.

Example 15 is the one or more media of any one of Examples 11 to 14, wherein the communications via secondary access are to use a modulation and coding scheme (MCS) that is at a lowest MCS level among available MCS levels.

Example 16 is the one or more media of any one of Examples 11 to 15, wherein the instructions, when executed, further cause the UE to obtain another scheduling grant to provide the UE with primary access to another set of resource elements that are designated for half-duplex communications.

Example 17 is an apparatus to be employed by a base station of a wireless cellular network, the apparatus comprising: a memory to store information related to a plurality of user equipments (UEs) that are in a radio resource control (RRC) Connected state with the base station; and a processor coupled to the memory, the processor to: encode a first scheduling grant for transmission to a first UE of the plurality of UEs to schedule the first UE for primary access to a downlink resource group; encode a second scheduling grant for transmission to a second UE of the plurality of UEs to schedule the second UE for secondary access to the downlink resource group; encode data or control information for transmission to the first UE on the downlink resource group; obtain supplemental control information from the second UE on the downlink resource group; determine one or more communication parameters for a subsequent downlink transmission to the second UE based on the obtained supplemental control information; and encode a downlink message for the subsequent downlink transmission to the second UE.

Example 18 is the apparatus of Example 17, wherein the supplemental control information includes: a channel quality indicator (CQI); a modulation and coding scheme (MCS) estimate; hybrid automatic repeat request (HARQ) feedback; or multiple input multiple output (MIMO) feedback that includes a rank indicator (RI) and a pre-coding matrix indicator (PMI).

Example 19 is the apparatus of Example 17 or Example 18, wherein the second scheduling grant is to indicate to the second UE to use a modulation and coding scheme (MCS) that is at a lowest MCS level among available MCS levels.

Example 20 is the apparatus of any one of Examples 17 to 19, wherein the memory is to store a first list of UEs of the plurality of UEs that are to be scheduled for downlink transmissions in one or more subframes including the downlink resource group, and a second list of UEs of the plurality of UEs that are eligible for secondary access in the one or more subframes; and wherein the processor is to select the first UE from the first list and the second UE from the second list.

Example 21 is the apparatus of Example 20, wherein the processor is to select the second UE for secondary access that has a lowest UE-UE interference with the first UE among the UEs on the second list.

Example 22 is the apparatus of Example 21, wherein the processor is to select the second UE for secondary access from among a subset of UEs from the second list that have a UE-UE interference with the first UE that is below a threshold, wherein the second UE is selected from the subset of UEs based on one or more performance metrics.

Example 23 is an apparatus to be employed by a base station of a wireless cellular network, the apparatus including: means for scheduling a first user equipment (UE) for primary access in a first communication direction on a resource block of a wireless communication network; means for scheduling a second UE for secondary access in a second communication direction on the resource block, wherein the second communication direction is opposite the first communication direction; means for communicating with the first UE in the first communication direction on the resource block; and means for communicating with the second UE in the second communication direction on the resource block, wherein the communication with the second UE includes: a channel quality indicator (CQI); modulation and coding scheme (MCS) feedback; hybrid automatic repeat request (HARQ) feedback; or multiple input multiple output (MIMO) feedback that includes a rank indicator (RI) and a pre-coding matrix indicator (PMI).

Example 24 is the apparatus of Example 23, wherein the first communication direction is uplink and the second communication direction is downlink, and wherein the communication with the second UE is a downlink transmission including the CQI, the MCS feedback, or the HARQ feedback.

Example 25 is the apparatus of Example 23, wherein the first communication direction is downlink and the second communication direction is uplink, wherein the communication with the second UE includes an uplink message, and wherein the apparatus further comprises means for modifying one or more communication parameters for a subsequent downlink transmission to the second UE based on the uplink message.

Example 26 is a method to be performed by a base station, the method comprising: scheduling a first user equipment (UE) for primary access in a first communication direction on resource elements of a wireless communication network; scheduling a second UE for secondary access in a second communication direction on the resource elements, wherein the second communication direction is opposite the first communication direction; communicating with the first UE in the first communication direction on the resource elements; and communicating with the second UE in the second communication direction on the resource elements, wherein the communication with the second UE includes supplemental control information.

Example 27 is the method of Example 26, wherein the supplemental control information includes: a channel quality indicator (CQI); hybrid automatic repeat request (HARQ) feedback; or multiple input multiple output (MIMO) feedback that includes a rank indicator (RI) and a pre-coding matrix indicator (PMI).

Example 28 is the method of Example 27, wherein the first communication direction is downlink, wherein the second communication direction is uplink, wherein the supplemental control information includes the CQI or the MIMO feedback, and wherein the method further includes modifying, based on the CQI or the MIMO feedback, one or more communication parameters for communication with the second UE in a subsequent downlink primary access grant for the second UE.

Example 29 is the method of Example 27 or Example 28, wherein the first communication direction is downlink, wherein the second communication direction is uplink, wherein the supplemental control information includes the HARQ feedback, wherein the HARQ feedback includes a negative acknowledgement (NACK) to indicate that the second UE did not receive a previously transmitted data packet, and wherein the method further comprises re-transmitting the data packet responsive to the NACK.

Example 30 is the method of any one of Examples 26 to 29, wherein the base station is to communicate with the first UE using a first modulation and coding scheme (MCS) and a first transmission power and is to communicate with the second UE using a second MCS and a second transmission power, wherein the second MCS is at a lower MCS level than the first MCS and the second transmission power is less than the first transmission power.

Example 31 is the method of any one of Examples 26 to 30, wherein the first communication direction is downlink, wherein the second communication direction is uplink, and wherein the instructions, when executed, further cause the base station to select the second UE for secondary access that has a lowest UE-UE interference with the first UE among UEs eligible for secondary access on the resource elements.

Example 32 is the method of any one of Examples 26 to 30, wherein the first communication direction is downlink, wherein the second communication direction is uplink, and wherein the instructions, when executed, further cause the base station to select the second UE for secondary access from among a plurality of eligible UEs that have a UE-UE interference with the first UE that is below a threshold, wherein the second UE is selected from the plurality of eligible UEs based on one or more performance metrics.

Example 32 is the method of Example 31, wherein the one or more performance metrics include a data rate or latency of the plurality of eligible UEs.

Example 33 is the method of Example 26 or any other suitable Example, wherein the first communication direction is uplink, wherein the second communication direction is downlink, and wherein the instructions, when executed, further cause the base station to select the second UE for secondary access based on a channel quality, quality of service requirement, or latency requirement of the second UE.

Example 34 is the method of any one of Examples 26 to 33, wherein the instructions, when executed, further cause the base station to schedule other resource elements for half-duplex communications.

Example 35 is a method to be performed by a user equipment (UE), the method comprising: receiving a scheduling grant from a base station of a wireless communication network to schedule the UE for secondary access to a set of resource elements on which to communicate with the base station in a first communication direction that is opposite from a second communication direction in which another UE is to communicate with the base station on the set of resource elements; and communicating supplemental control information with the base station on the set of resource elements, wherein the supplemental control information includes: a channel quality indicator (CQI); hybrid automatic repeat request (HARQ) feedback; or multiple input multiple output (MIMO) feedback that includes a rank indicator (RI) and a pre-coding matrix indicator (PMI).

Example 36 is the method of Example 35, wherein the scheduling grant indicates a type of the supplemental control information to be communicated on the set of resource elements.

Example 37 is the method of Example 35 or Example 36, wherein the scheduling grant is a first scheduling grant, wherein the set of resource elements is a first set of resource elements, and wherein the method further comprises: receiving a second scheduling grant to schedule the UE for primary access on the second set of resource elements; and communicating primary control information with the base station on the second set of resource elements, wherein the primary control information includes at least some of the same information included in the supplemental control information.

Example 38 is the method of any one of Examples 35 to 37, wherein the first communication direction is downlink, wherein the second communication direction is uplink, wherein the supplemental control information includes the HARQ feedback, wherein the HARQ feedback includes a negative acknowledgement (NACK) to indicate that the base station did not receive a previously transmitted data packet, and wherein the method further comprises re-transmitting the data packet responsive to the NACK.

Example 39 is the method of any one of Examples 35 to 38, wherein the communications via secondary access are to use a modulation and coding scheme (MCS) that is at a lowest MCS level among available MCS levels.

Example 40 is the method of any one of Examples 35 to 39, wherein the method further comprises receiving another scheduling grant to provide the UE with primary access to another set of resource elements that are designated for half-duplex communications.

Example 40 is an apparatus comprising means to perform the method of any one of claims 26 to 39.

Example 41 is an apparatus comprising circuitry to perform the method of any one of claims 26 to 39.

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media having instructions, stored thereon, that when executed by one or more processors of a base station, cause the base station to:
   schedule a first user equipment (UE) for primary access in a first communication direction on resource elements of a wireless communication network;
   schedule a second UE for secondary access in a second communication direction on the resource elements, wherein the second communication direction is opposite the first communication direction;
   communicate with the first UE in the first communication direction on the resource elements using a first modulation and coding scheme (MCS) and a first transmission power; and
   communicate with the second UE in the second communication direction on the resource elements using a second MCS and a second transmission power, wherein the communication with the second UE includes supplemental control information, and wherein the second MCS is at a lower MCS level than the first MCS and the second transmission power is less than the first transmission power.

2. The one or more media of claim 1, wherein the supplemental control information includes:
   a channel quality indicator (CQI);
   hybrid automatic repeat request (HARQ) feedback; or
   multiple input multiple output (MIMO) feedback that includes a rank indicator (RI) and a pre-coding matrix indicator (PMI).

3. The one or more media of claim 2, wherein the first communication direction is downlink, wherein the second communication direction is uplink, wherein the supplemental control information includes the CQI or the MIMO feedback, and wherein the instructions, when executed, further cause the base station to modify, based on the CQI or the MIMO feedback, one or more communication parameters for communication with the second UE in a subsequent downlink primary access grant for the second UE.

4. The one or more media of claim 2, wherein the first communication direction is downlink, wherein the second communication direction is uplink, wherein the supplemental control information includes the HARQ feedback, wherein the HARQ feedback includes a negative acknowledgement (NACK) to indicate that the second UE did not receive a previously transmitted data packet, and wherein the instructions, when executed, further cause the base station to re-transmit the data packet responsive to the NACK.

5. The one or more media of claim 1, wherein the first communication direction is downlink, wherein the second communication direction is uplink, and wherein the instructions, when executed, further cause the base station to select the second UE for secondary access that has a lowest UE-UE interference with the first UE among UEs eligible for secondary access on the resource elements.

6. The one or more media of claim 1, wherein the first communication direction is downlink, wherein the second communication direction is uplink, and wherein the instructions, when executed, further cause the base station to select the second UE for secondary access from among a plurality of eligible UEs that have a UE-UE interference with the first UE that is below a threshold, wherein the second UE is selected from the plurality of eligible UEs based on one or more performance metrics.

7. The one or more media of claim 6, wherein the one or more performance metrics include a data rate or latency of the plurality of eligible UEs.

8. The one or more media of claim 1, wherein the first communication direction is uplink, wherein the second communication direction is downlink, and wherein the instructions, when executed, further cause the base station to select the second UE for secondary access based on a channel quality, quality of service requirement, or latency requirement of the second UE.

9. The one or more media of claim 1, wherein the instructions, when executed, further cause the base station to schedule other resource elements for half-duplex communications.

10. One or more non-transitory computer-readable media having instructions, stored thereon, that when executed by one or more processors of a user equipment (UE), cause the UE to:
   obtain a scheduling grant from a base station of a wireless communication network to schedule the UE for secondary access to a set of resource elements on which to communicate with the base station in a first communication direction that is opposite from a second communication direction in which another UE is to communicate with the base station on the set of resource elements, wherein the scheduling grant indicates a type of supplemental control information to be communicated on the set of resource elements; and
   communicate the supplemental control information with the base station on the set of resource elements, wherein the supplemental control information includes:
      a channel quality indicator (CQI);
      hybrid automatic repeat request (HARQ) feedback; or
      multiple input multiple output (MIMO) feedback that includes a rank indicator (RI) and a pre-coding matrix indicator (PMI).

11. The one or more media of claim 10, wherein the scheduling grant is a first scheduling grant, wherein the set of resource elements is a first set of resource elements, and wherein the instructions, when executed, further cause the UE to:
obtain a second scheduling grant to schedule the UE for primary access on a second set of resource elements; and
communicate primary control information with the base station on the second set of resource elements, wherein the primary control information includes at least some of the same information included in the supplemental control information.

12. The one or more media of claim 10, wherein the first communication direction is downlink, wherein the second communication direction is uplink, wherein the supplemental control information includes the HARQ feedback, wherein the HARQ feedback includes a negative acknowledgement (NACK) to indicate that the base station did not receive a previously transmitted data packet, and wherein the instructions, when executed, further cause the UE to re-transmit the data packet responsive to the NACK.

13. The one or more media of claim 12, wherein the communications via secondary access are to use a modulation and coding scheme (MCS) that is at a lowest MCS level among available MCS levels.

14. The one or more media of claim 12, wherein the instructions, when executed, further cause the UE to obtain another scheduling grant to provide the UE with primary access to another set of resource elements that are designated for half-duplex communications.

15. An apparatus to be employed by a base station of a wireless cellular network, the apparatus comprising:
a memory to store information related to a plurality of user equipments (UEs) that are in a radio resource control (RRC) connected state with the base station, wherein the information includes a first list of UEs of the plurality of UEs that are to be scheduled for downlink transmissions in one or more subframes including a downlink resource group, and a second list of UEs of the plurality of UEs that are eligible for secondary access in the one or more subframes; and
a processor coupled to the memory, the processor to:
select a first UE from the first list and a second UE from the second list;
encode a first scheduling grant for transmission to the first UE to schedule the first UE for primary access to the downlink resource group;
encode a second scheduling grant for transmission to the second UE to schedule the second UE for secondary access to the downlink resource group;
encode data or control information for transmission to the first UE on the downlink resource group;
obtain supplemental control information from the second UE on the downlink resource group;
determine one or more communication parameters for a subsequent downlink transmission to the second UE based on the obtained supplemental control information; and
encode a downlink message for the subsequent downlink transmission to the second UE.

16. The apparatus of claim 15, wherein the supplemental control information includes:
a channel quality indicator (CQI);
a modulation and coding scheme (MCS) estimate;
hybrid automatic repeat request (HARQ) feedback; or
multiple input multiple output (MIMO) feedback that includes a rank indicator (RI) and a pre-coding matrix indicator (PMI).

17. The apparatus of claim 15, wherein the second scheduling grant is to indicate to the second UE to use a modulation and coding scheme (MCS) that is at a lowest MCS level among available MCS levels.

18. The apparatus of claim 15, wherein the processor is to select the second UE for secondary access that has a lowest UE-UE interference with the first UE among the UEs on the second list.

19. The apparatus of claim 18, wherein the processor is to select the second UE for secondary access from among a subset of UEs from the second list that have a UE-UE interference with the first UE that is below a threshold, wherein the second UE is selected from the subset of UEs based on one or more performance metrics.

20. One or more non-transitory computer-readable media having instructions, stored thereon, that when executed by one or more processors of a base station, cause the base station to:
schedule a first user equipment (UE) for primary access in a downlink direction on resource elements of a wireless communication network;
schedule a second UE for secondary access in an uplink direction on the resource elements, wherein the second communication direction is opposite the first communication direction, and wherein the second UE is selected for secondary access, from among a plurality of eligible UEs that have a UE-UE interference with the first UE that is below a threshold, based on a data rate or a latency of the plurality of eligible UEs;
communicate with the first UE in the downlink direction on the resource elements; and
communicate with the second UE in the uplink direction on the resource elements, wherein the communication with the second UE includes supplemental control information.

21. The one or more media of claim 20, wherein the supplemental control information includes:
a channel quality indicator (CQI);
hybrid automatic repeat request (HARQ) feedback; or
multiple input multiple output (MIMO) feedback that includes a rank indicator (RI) and a pre-coding matrix indicator (PMI).

22. The one or more media of claim 21, wherein the supplemental control information includes the CQI or the MIMO feedback, and wherein the instructions, when executed, further cause the base station to modify, based on the CQI or the MIMO feedback, one or more communication parameters for communication with the second UE in a subsequent downlink primary access grant for the second UE.

23. The one or more media of claim 21, wherein the supplemental control information includes the HARQ feedback, wherein the HARQ feedback includes a negative acknowledgement (NACK) to indicate that the second UE did not receive a previously transmitted data packet, and wherein the instructions, when executed, further cause the base station to re-transmit the data packet responsive to the NACK.

* * * * *